United States Patent [19]

Pfister

[11] Patent Number: 5,202,749
[45] Date of Patent: Apr. 13, 1993

[54] PROCESS AND DEVICE FOR OBSERVING MOIRE PATTERNS OF SURFACES TO BE TESTED BY APPLICATION OF THE MOIRE METHOD USING PHASE SHIFTING

[76] Inventor: Klaus Pfister, Vagener Weg 76, D-8206 Bruckmühl, Fed. Rep. of Germany

[21] Appl. No.: 690,917
[22] PCT Filed: Dec. 22, 1989
[86] PCT No.: PCT/DE89/00788
§ 371 Date: Jun. 21, 1991
§ 102(e) Date: Jun. 21, 1991
[87] PCT Pub. No.: WO90/07691
PCT Pub. Date: Jul. 12, 1990

[30] Foreign Application Priority Data

Dec. 23, 1988 [DE] Fed. Rep. of Germany ....... 3843396
Mar. 8, 1989 [DE] Fed. Rep. of Germany ....... 3907430

[51] Int. Cl.[5] ............................................. G01B 11/24
[52] U.S. Cl. ................................... 356/376; 250/237 G
[58] Field of Search .................... 356/376; 250/237 G

[56] References Cited

U.S. PATENT DOCUMENTS

| | | |
|---|---|---|
| 3,627,427 | 12/1971 | Johnson ............................... 356/376 |
| 4,212,073 | 7/1980 | Balasubramanian . |
| 4,349,277 | 9/1982 | Mundy et al. ....................... 356/376 |
| 4,641,972 | 2/1987 | Halioua et al. ..................... 356/376 |
| 4,939,380 | 7/1990 | Berger et al. ....................... 356/376 |

FOREIGN PATENT DOCUMENTS

| | | |
|---|---|---|
| 0076866 | 10/1981 | European Pat. Off. . |
| 0182469 | 5/1986 | European Pat. Off. . |
| 0262089 | 3/1988 | European Pat. Off. . |
| 2163040 | 9/1972 | Fed. Rep. of Germany . |
| 3527074 | 5/1986 | Fed. Rep. of Germany . |
| 3817559 | 5/1988 | Fed. Rep. of Germany . |
| 3934423 | 10/1989 | Fed. Rep. of Germany . |
| 3843396 | 7/1990 | Fed. Rep. of Germany . |
| 3907430 | 3/1991 | Fed. Rep. of Germany . |
| 2204397 | 11/1988 | United Kingdom . |

OTHER PUBLICATIONS

Idesawa et al., "Scanning moire method and automatic measurement of 3-D shapes", *Applied Optics*, vol. 16, No. 8, (Aug. 1977), pp. 2152-2162.
Wutzke, G., Über geometrische, Materialprut 20 (1978).
Breuckmann, B. and Thieme, W., Ein rechner gestutztes Holographiesystem etc., VDI Bericht 552 (1985).
Breuckmann et al., Einsatz hochstauflosender etc. VDI--Bericht 679 (1988).

*Primary Examiner*—Richard A. Rosenberger
*Attorney, Agent, or Firm*—Dennison, Meserole, Pollack & Scheiner

[57] ABSTRACT

The object of the invention is a process for observing moiré patterns of surfaces to be tested, wherein the object gratings to be observed are pictured onto auxiliary gratings and the moiré patterns generated thereby are detected, stored and/or processed by computer, wherein for each observation at least phase-shifted moiré patterns are respectively evaluated. Furthermore, the invention relates to a device for observing moiré patterns of the surfaces to be tested by applying the moiré method using phase shifting. For an observation of the phase-shifted moiré patterns associated with the object grating are simultaneously generated, pictured and detected by superposition of the object grating image with auxiliary gratings which are disposed in a phase-shifted manner.

21 Claims, 2 Drawing Sheets

PROCESS AND DEVICE FOR OBSERVING MOIRE PATTERNS OF SURFACES TO BE TESTED BY APPLICATION OF THE MOIRE METHOD USING PHASE SHIFTING

BACKGROUND OF THE INVENTION

The invention relates to a process for patterns observing moiré patterns of surfaces to be tested by application of the moiré method using phase shifting wherein object gratings to be observed are pictured on auxiliary gratings and the moiré patterns generated thereby are detected, stored and/or processed by computer, wherein for one observation at least three phase-shifted moiré patterns are respectively evaluated. Furthermore, the invention is related to a device for observing moiré patterns of surfaces to be tested by application of the moiré method using phase shifting, optionally comprising a grating projection arrangement, an object grating of the surface to be tested, an observation objective, an auxiliary grating, a camera arrangement, a memory and/or computer.

The process and the method of the first mentioned type are not restricted to the projection moiré method, which is provided for out of plane measurements. Moreover, they can generally be applied to the observation, measuring and documentation of gratings and of their changings to be evaluated by applying the moiré method, and therefore they are also provided for the observation and measurement of in-plane deformations, in the case of which gratings are fixedly applied on or in the surface of the object to be tested and thus deformation measurements can be made in the plane. Therefore, object grating here is to be understood being the grating on or in the object as well the projected grating.

By using a process and a device of the first mentioned type surfaces and their deformation are observed, wherein the surface shape and its deformation respectively are taken up and documented. The field of application extends from microscopic observation (e.g. in the field of material testing, biology or medicine) to the observation of surfaces having m² size (e.g. in the automobile industry). The observation of surfaces and of their deformation can be made in different ways. Current processes of surfacelike observation are apart from the different moiré methods the photogrammetry, the holography, and with restrictions the motography. These methods are applied partially in competition, partially complementary to one another.

In U.S. Pat. No. 4,641,972 a process for determining the surface profile of an object is described, wherein a light beam having a sinusoidally changing intensity pattern is directed to the object, wherein the phase of the sinusoidal pattern is modulated. A deformed grating image of the object is received by means of a detector arrangement for a number of different modulated phases of the impinging light beam. Thus, an object and a reference phase are obtained for the object and a reference plane point-by-point. The height of each point of the object surface is then determined in relation to the reference plane on basis of the phase differences.

The projection moiré method is particularly simple and economical for observing surfaces and their deformation. The measuring principle involved is the following: A line grating is projected in an inclined manner at a defined angle onto the surface to be measured, wherein the brightness distribution of the grating generally corresponds to a trigonometric function. The surface is observed by a camera or the like at another angle, the observer or the camera respectively usually being present in the same vertical distance from the surface. Two observations or images respectively are superposed, which have a reference to different surface shapes and in this manner a moiré pattern is generated. Thus, a relative measurement is performed using two observations made successively concerning time. Provided determined marginary conditions are kept, the single orders of the moiré pattern correspond to equidistant contour lines. Studies of geometric factors affecting the use concerning the projection moiré method are described by G. Wutzke in "On geometric factors affectinq the use in moiré topography", Materialprü . 20 (1978), No. 9, pages 338 to 342.

In a conventional arrangement disclosed in German published application 35 27 074, operating with application of the projection moiré method, provided for determining the surface shape of objects for the use in a stereomicroscope, in particular for the examination and operations of eyes, a projection and a reference grating with optical means for shifting the image of the projected grating and being arranged sequentially to the reference grating are used. In the European published application 0 262 089 a further device for measuring the surface of an object is described, wherein the moiré fringe pattern is generated by combining two bar gratings and stripe images deformed at the object surface are taken up by a video camera and are evaluated by an electronic circuit. The bar gratings are shifted with relation to each other, whereby the phase of the fringe pattern can be changed by measurable amounts.

For the evaluation it is often sufficient to use only the moiré pattern reduced to the lines of maximum brightness or maximum blackening. However, it is advantageous to apply the phase-shift method instead of such a line-thinning process of the moiré pattern. When using the phase-shift method there are required at least three single pick-ups for each of both modulo-2-pi images or phase portraits, which are respectively allocated to a certain surface shape, and for the evaluation a computer is required. Thus, the reference grating of two superposed grating images is respectively observed in its original or basis position, and in two positions shifted thereto, which usually are shifted by 120° in phase so that three intensity distributions are taken up for each object point. Because of the shifting the three pick-ups are taken successively in time. Correspondingly the projection arrangement comprises a suitable device for enabling the phase-shifted grating projection, i.e. the phase shifting The phase-shift method is distinguished by a simple computer processing, since contrary to the line-thinning process the counting direction of the fringes is recognized and in practice no interactive operation is required. Furthermore, resolution is possible into fractions of a moiré order. The degree of resolution is herewith dependent on the precision of the shifting and of the quality of the observed $\sin^2$ brightness gradient of the grating.

An application of the phase-shift method is e.g described in B. Breuckmann and W. Thieme "A computer supported holographic system for the use in industry", VDI Report, 552 (1985), pages 27 to 36. A further process and system for the observation of surfaces is known from U.S. Pat. No. 4,212,073, wherein a sinusoidal grating is shifted in three steps by a quarter period of the grating respectively, the intensity of the radiation from the surface is detected and stored for each step. By the use of simple arithmetic operations point heights are determined from these stored values. The conventional phase shift method has the disadvantage that the shape of the surface must not be changed or be changed only in an unessential matter during the time of taking up. Therefore, the phase-shift method could only be applied for static tests or, if really necessary, for the observation of very slow changes. When using this process, dynamic measurements, in particular in the short-time field with dynamic, quickly developing changements of the surface form structures are not possible.

For increasing the sensitivity in case of the projected fringe method, i.e. for increasing the resolution with increasing distance of the contour lines from each other, the projection angle has to be large and the grating scaling has to be as small as possible. A restriction herein results from the digitizing of the image data caused by the computer, which results in a restriction of the spatial frequency. By the provision of an additional auxiliary grating having a suitable slightly different scaling (mismatch) the line density can be increased by one to two orders and thereby the resolution can be increased considerably. The grating projection to be registered is pictured onto this auxiliary grating, with an essentially coarser moiré pattern being generated having a line density sufficient for the requirements of digitizing. Accordingly, an auxiliary storing of the grating projection to be registered is made by means of a moiré pattern. Since both of the pick-ups being superposed are pictured on the same auxiliary grating, the influence of the latter on the auxiliarily generated pattern of the modulo-2-pi images is cancelled after suposition of two such pick-ups. Corresponding computer supported optical measurement processes are described in "Application of optical processes have a maximum resolution in the field of surface testing and of 3-D measurement technique" by B. Breuckmann and P. Lëbeck, VDI Report 679 (1988), pages 71 to 76.

SUMMARY OF THE INVENTION

The object underlying the invention is to enable application of moiré processes on dynamic and short-time measurements. This object is solved by the invention with a process and a device having the features as hereinafter described and also recited in the claims. Advantageous further developments of the process and of the device are subject of the subclaims.

The process according to the invention thus is characterised in that for observing the phase-shifted moiré patterns associated to the object grating are simultaneously generated and pictured as well as detected by the superposition of the object grating image with the auxiliary gratings which are shifted in phase to each other, i.e. are disposed in a phase-displaced manner. By means of the process and the device according to the invention thus a rigid grating projection and a rigid grating being provided on the surface of the object respectively is used and shifted on the observation side. By simultaneous generation of the moiré pattern and image, i.e. the drawing in of the single observations into the image memory or computer in a parallel manner with respect to time, the time required for the individual measurement is extremely small and the restriction of the process in time is not resulting from the phase-shifting process itself, but from the exposure time or the time required for storing an image. Therefore, it is thus depending on the used equipment.

In the process according to the invention the phase shift of the auxiliary gratings is conveniently provided in two directions, preferably vertical to each other. This enables measurement of deformations in the main priviledged direction of the gratings.

Concerning an advantageous modification of the process according to the invention the phase-shifted moiré patterns are generated by picturing the object grating by at least three partial beams onto at least three separate auxiliary gratings, which are arranged phase-shifted to each other, and by simultaneously detecting the phase-shifted moiré pattern which are generated there. The moiré patterns are then simultaneously transmitted to the image processing for storing and/or for the electronic evaluation.

Alternatively, the phase-shifted moiré patterns can be generated by picturing the object grating onto an auxiliary grating by means of an observation beam, the auxiliary grating including at least three auxiliary gratings packed together and having at least the threefold scale in relation to the scale required for the generation of a single moiré pattern, wherein the single phase-shift moiré patterns are detected by storing the interleaving moiré patterns of the interleaved auxiliary grating in a line/column-like manner corresponding to the at least threefold scaling. The auxiliary grating packed together therefore can be selectively observed by reading line-by-line or column-by-column resp. An advantageous embodiment of such an auxiliary grating packed together is the array of a CCD camera wherein the columns or lines being associated with a single auxiliary grating can be read for evaluation pixel-by-pixel, wherein the at least three single images can easily be derived from the convolution integral. An advantage of this modification of the process is that the test assembly is very simple, since in view of the process modification having the beam splitting and in particular concerning the realization having an auxiliary grating separate from the camera the auxiliary gratings, the adjustment of which to each other is difficult, and the administration of several image series to be stored in a manner parallel to each other are cancelled. Possibly, a lower loss of light intensity takes place, since the required beam splitting is cancelled with the interleaving auxiliary gratings. However, the application of an auxiliary grating which is packed together results in a smaller resolution than in case of process modifications operating with beam splitting.

If picturing is made onto only one auxiliary grating line or column, the two-dimensional camera observation being reduced to one line, a CCD line array having a very high pixel number can advantageously be used. In this manner a profile section having a very high resolution can be obtained instead of a surface-like general view having a smaller resolution.

The process according to the invention and to the described modification uses white light or monochromatic light and the shifting operation is made on the observer side, i.e between object and observer. Alternatively the phase-shift moiré patterns can also be generated according to the invention by simultaneously and superposedly projecting and observing at least three object gratings having different colours and being arranged in a phase-shifted manner and by detecting the single phase-shifted moiré patterns by separating the moiré pattern of the object grating images, which is packed together, in a colour-selective manner or by filtering it out respectively. In this case the shifting operation is made on the illumination side, i.e. between light source and object, and it consists in the simultaneous projection of phase-shifted patterns. Thus a colour-coded pattern is projected onto the object.

A device according to the invention for observing moiré patterns of surfaces to be tested by application of the projected fringe method using phase shifting comprises
- an object grating on the surface to be tested,
- an observation objective,
- an auxiliary grating,
- a camera arrangement,
- a memory and/oder computer, and is characterised in that
- at least three auxiliary gratings are positioned behind the object grating in a phase-shifted manner and
- the camera arrangement detects the moiré patterns phase-shifted by the auxiliary gratings respectively simultaneously.

Preferably gratings which are in particular crossed in a manner vertical to one another, e.g. line gratings are provided which allow measurement of the deformations in their main directions.

For forming the phase-shifted auxiliary grating preferably beam splitters splitting the beam into at least three partial beams are arranged in the path of the rays and at least three separate auxiliary gratings and cameras arranged behind these are provided. As beam splitters splitting plates or prisms are advantageously provided and the auxiliary gratings are arranged in the camera image plane, shifted with respect to each other for producing phase-shifted moiré patterns. In case a prisma is provided as a beam splitter, a colour filter is suitably arranged before the beam splitter in the path of the rays. This embodiment of the device according to the invention therefore is built up following the principle of beam splitting the pick-up of the three partial images, which is realised for completely different applications, e.g. in three colour cameras (e.g. according to Bermpohl). For beam splitting, splitting plates or prisms are provided. In case of the application of prisms a colour filter for obtaining monochromatic light is suitable. Concerning the device according to the invention no colour separations, but phase-shifted moiré patterns are generated by the camera, by picturing the object grating, i.e. the grating being present on the object or being projected thereon, is pictured onto auxiliary gratings in the camera imaging plane. Auxiliary gratings and the camera imaging plane therefore coincide. The superposition results in moiré patterns and a rigidly displaced disposition of the auxiliary gratings in relation to each other and in relation to the path of the rays results in phase-shifted moiré patterns.

Alternatively, an auxiliary grating including at least three auxiliary gratings in a manner packed together having a line or column scaling, which should be at least the threefold of the scaling necessary for generating a moiré pattern can be provided as well as a camera can be arranged behind the auxiliary grating and a reading means can be provided, which reduces the lines or columns of the auxiliary grating pattern to the phase-shifted moiré patterns.

Concerning a preferred embodiment of the invention the auxiliary gratings are provided having one line or column.

The auxiliary grating(s) is (are) preferably provided by sensors constituted in a grating-like manner, a sensor array being conveniently provided.

When microchannel plates are provided as auxiliary gratings or sensor gratings, this enables using very short exposure times in the ns region. At present, when using microchannel plates the bad precision of these and the small number of points still can be realised.

In some applications a video camera or a camera of the drum type are provided.

The gratings can be rigidly applied onto the surface to be tested. However, also a projection arrangement can be provided for the object grating.

In the following the invention is further explained by means of the description of preferred embodiments and of the drawings. The embodiments only serve the purpose of explaining and are not to be considered to be restricting, particularly also not in relation to the presence or missing of individual elements.

In the drawings there is shown by

DESCRIPTION OF THE INVENTION

Figure 1:
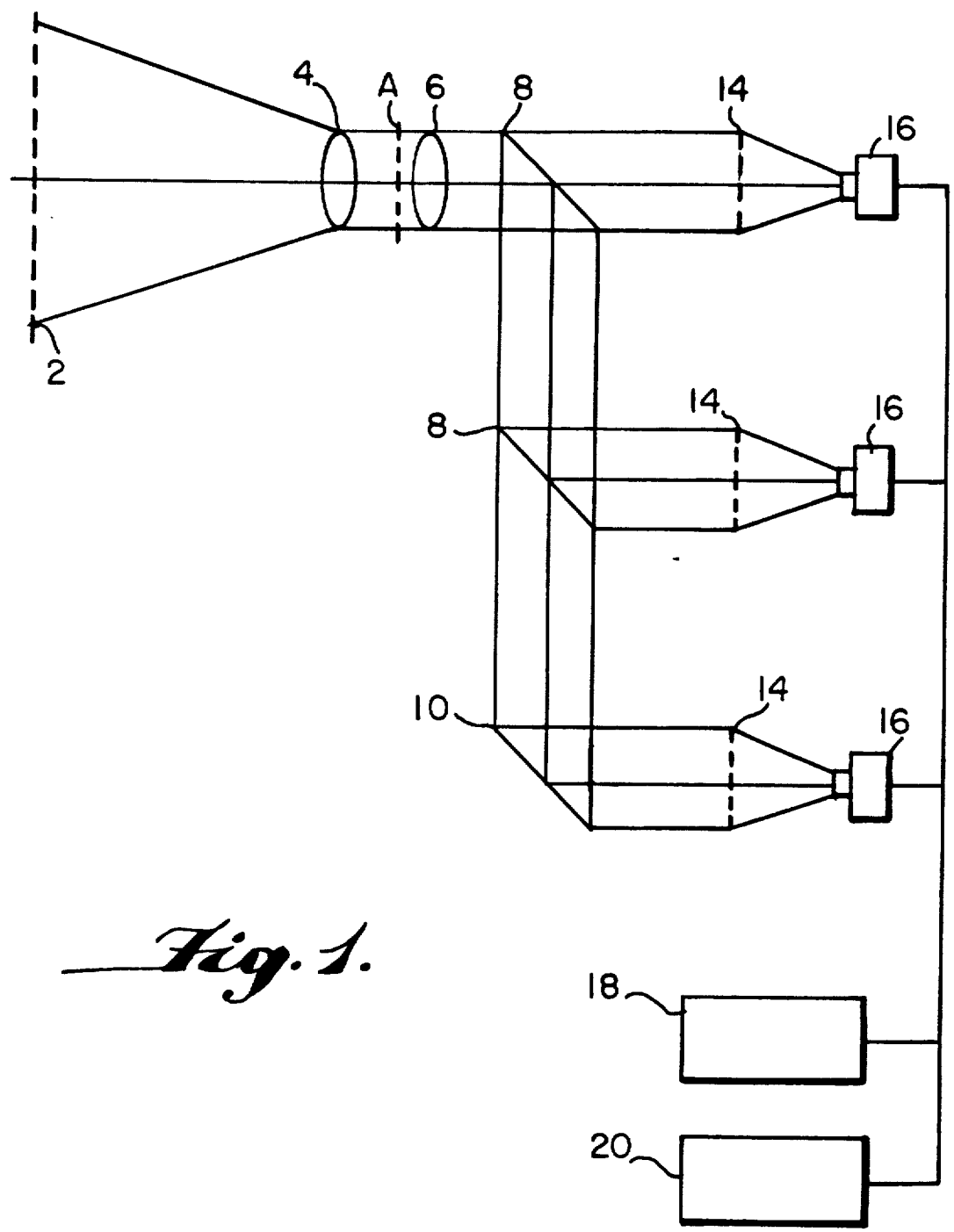
FIG. 1 is the schematic structure of a device having beam splitting.

In a device of FIG. 1 a picturing path of the provided behind the object grating 2 comprises an objective 4 and optic means 6 with a virtual image A of the grating pattern to be observed. By means of beam splitters 8, e.g. in the form of splitting plates, splitting cubes or mirrors 10 the path of the rays is splitted up and the object grating 2 is pictured onto three auxiliary gratings 14. The auxiliary gratings 14 are adjusted in the path of the rays in relation to each other exactly by corresponding phase angles, e.g. 120°. Observers 16, e.g. cameras such video cameras or optical cameras of the drum type are arranged respectively connected behind the three auxiliary gratings 14. A set of images, from which a modulo-2-pi image is calculated, is simultaneously observed and transmitted to a memory as or a computer 20.

The auxiliary gratings 14 can also be formed by sensors built up in a grating-like manner, in which case the imaging optic means of the camera then are cancelled and instead only sensor arrays are positioned for obtaining higher light intensities.

Figure 2:
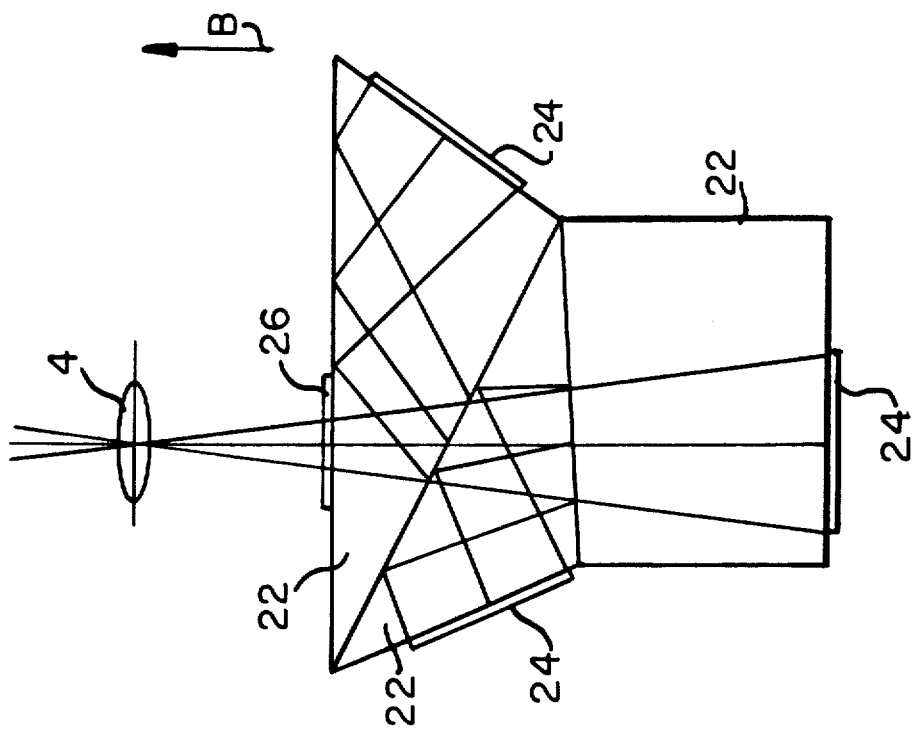
FIG. 2 is a second embodiment of a device having beam splitting using prisms and CCD arrays as auxiliary gratings.

In the device according to a second embodiment of the invention shown in FIG. 2, a video camera is provided with prisms 22 for beam splitting. The observation direction is indicated by an arrow B. In case of the most simple structure CCD arrays 24 are arranged at the prisms, which CCD arrays combine the functions of the sensor and of the auxiliary grating. To prevent disturbing light diffraction in connection with the beam splitting monochromatic light is preferably used. For this purpose, a single colour filter 26 is conveniently provided in the common portion of the path of the rays behind the objective field 4. Alternatively, the grating or object grating respectively to be observed can be projected using monochromatic light.

Figure 3:
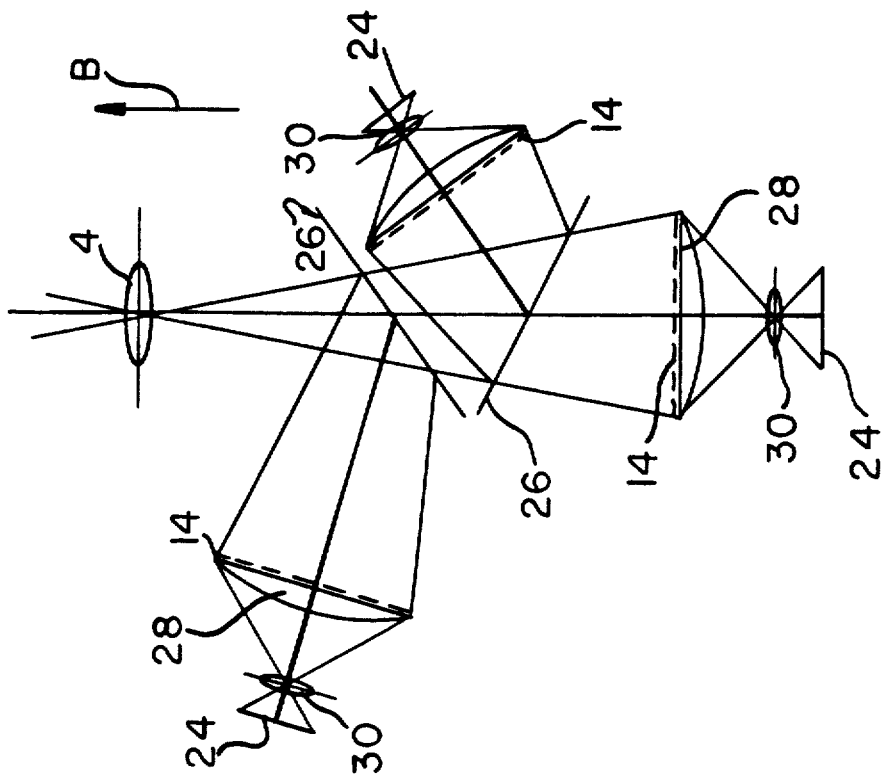
FIG. 3 is a third embodiment of a device having beam splitting using splitting plates and separate auxiliary gratings and sensors.

In FIG. 3 a third embodiment of the invention is shown, wherein splitting plates 8 are provided for beam splitting and the auxiliary gratings 14 and the sensors 24 are separated in space. Optic means comprising a field lens 28 and a macro objective 30 is disposed between the auxiliary gratings 14 and the sensors 24. The phase-shifted moiré patterns are received by the image sensors or memories. The observation direction is indicated by an arrow B.

Though in this arrangement the sensor has to fulfil the scanning theorem upon discrete scanning of the moiré pattern, however, its line density can be far below the resolution of the auxiliary gratings 14 determining the resolution per se. In view of the device having beam splitting according to the first embodiment the resolution of moiré measurements is increased in the case of sensors having the same number of lines/columns.

The invention has been described and presented by means of preferred embodiments and of selected features. Selfunderstandingly the invention is not restricted to these illustrations, but moreover all features can be used separately or in any combination, also independently from their combination in the claims.

I claim:

1. A device for observing moiré patterns of surfaces to be tested, said device applying the moiré method by phase shifting, comprising:
    observation objective means for receiving an object grating emitted from the object in the form of a picturing path of rays;
    a first auxiliary grating for generating a moiré pattern from the picturing path of rays;
    camera means for observing the moiré pattern generated from the picturing path of rays;
    means for storing and/or evaluating the observed moiré pattern generated from the picturing path of rays, said storing means connected to said camera means;
wherein the improvement comprises:
    at least two additional auxiliary gratings, said second and third auxiliary gratings positioned near said first auxiliary grating with all of said auxiliary gratings adjustably positioned in the path of the rays, between said observation objective means and said camera means, so as to be in a phase-shifted relationship to each other by a corresponding phase angle, each of said at least three auxiliary gratings generating a phase-shifted moiré pattern; and
    said camera means respectively detecting the phase-shifted moiré patterns simultaneously from each of the at least three auxiliary gratings.

2. The device according to claim 1, wherein said object grating and said at least three auxiliary gratings are two-fold and arranged in an angular manner and provide crossed line gratings for measuring.

3. The device according to claim 2, wherein said crossed line gratings are positioned vertical to each other.

4. The device according to claim 1, wherein a plurality of beam splitters are positioned between said object grating and said at least three auxiliary gratings in the path of the picturing ray, said plurality of beam splitters splitting the picturing ray into at least three partial beams.

5. The device according to claim 4, wherein said plurality of beam splitters are splitting plates or prisms.

6. The device according to claim 5, wherein a colour filter is positioned in the path of the picturing rays before the plurality of beam splitters.

7. The device of claim 1, wherein one of said at least three auxiliary gratings includes a plurality of sensor arrays for producing line or column pitch wherein the pitch is at least threefold of the pitch required for producing a moiré pattern; and
    reading means for resolving the lines or columns of the auxiliary grating pattern as lines or columns of the at least three phase-shifted patterns.

8. The device of claim 1, wherein said at least three auxiliary gratings generating a single line or column for the moiré pattern.

9. The device of claim 1, wherein said at least three auxiliary gratings include sensors positioned and being effective in a grating-line manner.

10. The device of claim 9, wherein at least one of said three auxiliary gratings includes a CCD camera array.

11. The device of claim 1, wherein at least one of said three auxiliary gratings includes a microchannel plate.

12. The device of claim 1, wherein said camera means includes a video camera.

13. The device of claim 1, wherein said camera means includes a drum type camera.

14. The device of claim 1, wherein said object grating is fixedly applied to the surfaces to be tested.

15. The device of claim 1, wherein said object grating includes a projection arrangement.

16. A method for observing moiré patterns of surfaces to be tested, said method applying the moiré method by phase-shifting, comprising the steps of:
    receiving an object grating in the form of a picturing path of rays emitted from the object surface;
    generating by means of a first auxiliary grating a moiré pattern from the picturing path of rays;
    observing the moiré pattern generated from the picturing path of rays;
    storing and/or evaluating the observed moiré pattern generated from the picturing path of rays;
wherein the improvement comprises the steps of:
    positioning at least two additional auxiliary gratings near said first auxiliary grating in the picturing path of the rays, wherein each auxiliary grating is in a phase-shifted relationship;
    generating a plurality of moiré patterns by said at least two additional auxiliary gratings simultaneously together with said generated moiré pattern by said first auxiliary grating;
    detecting at least three phase-shifted moiré patterns simultaneously generated; and
    evaluating said at least three phase-shifted moiré patterns simultaneously detected by superposition of an object generating image.

17. The method of claim 16, wherein the phase shift of the auxiliary gratings further comprises the step of:
    providing two directions preferably vertical to each other.

18. The method of claim 16, wherein the step of generating the phase-shifted moiré patterns further comprises the steps of:
    picturing the object grating by means of at least three partial beams onto said at lest three auxiliary gratings;
    arranging said at least three auxiliary gratings in a phase-shifted manner to each other; and
    detecting the generated phase-shifted moiré patterns simultaneously.

19. The method of claim 16, further comprising the steps of:
    generating the phase-shifted moiré patterns by picturing the object grating by means of a beam onto the auxiliary grating;

packing the at least three auxiliary gratings for generating at least threefold scaling;

detecting the single phase-shifted moiré patterns;

reading the moiré patterns by interleaving each other from the auxiliary gratings line-by-line/column-by-column.

20. The method of claim 16, further comprising the step of:
picturing only onto one auxiliary grating line or column.

21. The method of claim 16, wherein the step of generating further comprises the steps of:
observing at least three object gratings having a different colour; and detecting arranged phase-shifted and single phase shifted moiré patterns by separating the moiré pattern packed together of the object grating images selectively in colour.

* * * * *